United States Patent
Zenkyu et al.

(10) Patent No.: US 11,159,211 B2
(45) Date of Patent: Oct. 26, 2021

(54) RADIO TRANSMISSION DEVICE, BASEBAND PROCESSING DEVICE, RADIO TRANSMISSION METHOD, AND RADIO RECEPTION DEVICE

(71) Applicant: NEC Corporation, Tokyo (JP)

(72) Inventors: Ryuji Zenkyu, Tokyo (JP); Eisaku Sasaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/771,431

(22) PCT Filed: Nov. 2, 2018

(86) PCT No.: PCT/JP2018/040822
§ 371 (c)(1),
(2) Date: Jun. 10, 2020

(87) PCT Pub. No.: WO2019/116774
PCT Pub. Date: Jun. 20, 2019

(65) Prior Publication Data
US 2021/0075478 A1 Mar. 11, 2021

(30) Foreign Application Priority Data
Dec. 14, 2017 (JP) .............................. JP2017-239655

(51) Int. Cl.
*H04L 27/00* (2006.01)
*H04B 7/0456* (2017.01)

(52) U.S. Cl.
CPC ................................. *H04B 7/0456* (2013.01)

(58) Field of Classification Search
CPC .................................................. H04B 7/0456
(Continued)

(56) References Cited

U.S. PATENT DOCUMENTS 10,243,773 B1 * 3/2019 Shattil ................. H04L 27/2628
2006/0268623 A1 * 11/2006 Chae .................... H04B 7/0615
365/73

(Continued)

FOREIGN PATENT DOCUMENTS

JP 2009-194732 A 8/2009
JP 2015-231108 A 12/2015
(Continued)

OTHER PUBLICATIONS

International Search Report for PCT Application No. PCT/JP2018/040822, dated Jan. 29, 2019.

*Primary Examiner* — Tesfaldet Bocure
(74) *Attorney, Agent, or Firm* — Sughrue Mion, PLLC

(57) ABSTRACT

Provided is a radio transmission device, a baseband processing device, a radio transmission method, and a radio reception device that can reduce the peak to average power ratio in multiplex transmission using the OAM transmission system. In a baseband processing device (10), a signal formation unit (11) forms N number of multiplex signals corresponding to N number of antenna devices (32) by multiplying M number (M is a natural number equal to or larger than 2) of data symbols that are different from and parallel to each other by a "corrected weighting matrix". The "corrected weighting matrix" is obtained by adding the phase rotation matrix for suppressing the peak to a fixed OAM basic weighting matrix.

14 Claims, 12 Drawing Sheets

(58) Field of Classification Search
USPC .................. 375/267, 299; 455/101, 102, 103
See application file for complete search history.

(56) References Cited

U.S. PATENT DOCUMENTS

| | | |
|---|---|---|
| 2009/0207931 A1 | 8/2009 | Ohwatari et al. |
| 2015/0188660 A1* | 7/2015 | Byun ..................... H04J 14/04 398/44 |
| 2016/0254897 A1* | 9/2016 | Berretta ................... H04L 5/02 375/267 |
| 2017/0163451 A1 | 6/2017 | Willner et al. |
| 2017/0187442 A1 | 6/2017 | Luddy et al. |
| 2019/0028165 A1 | 1/2019 | Adachi et al. |
| 2019/0386717 A1* | 12/2019 | Shattil ................ H04L 27/2614 |

FOREIGN PATENT DOCUMENTS

| | | | |
|---|---|---|---|
| WO | 2017/125969 A1 | 7/2017 | |
| WO | WO-2019116774 A1 * | 6/2019 | ........... H04B 7/0456 |

* cited by examiner $$e^{i\frac{2\pi}{4}} \cdot \begin{bmatrix} 0 & 0 & 0 & 0 \\ 0 & 1 & 2 & 3 \\ 0 & 2 & 0 & 2 \\ 0 & 3 & 2 & 1 \end{bmatrix}$$

Fig. 4

$$e^{i\frac{2\pi}{4}} \cdot \begin{bmatrix} 0 & 0+0.5 & 0 & 0+0.5 \\ 0 & 1+0.5 & 2 & 3+0.5 \\ 0 & 2+0.5 & 0 & 2+0.5 \\ 0 & 3+0.5 & 2 & 1+0.5 \end{bmatrix}$$

Fig. 5

$$e^{i\frac{2\pi}{8}} \cdot \begin{bmatrix} 0 & 0 & & \cdots & 0 \\ 0 & 1 & 2 & \cdots & 7 \\ \vdots & 2 & 4 & & \\ & & & \ddots & \\ 0 & 7 & & & 1 \end{bmatrix}$$

Fig. 10

$$e^{i\frac{2\pi}{8}} \cdot \begin{bmatrix} 0 & 0 & 0 & 0 & 0 & 0 & 0 & 0 \\ 0 & 1 & 2 & 3 & 4 & 5 & 6 & 7 \\ 0 & 2 & 4 & 6 & 0 & 2 & 4 & 6 \\ 0 & 3 & 6 & 1 & 4 & 7 & 2 & 5 \\ 0 & 4 & 0 & 4 & 0 & 4 & 0 & 4 \\ 0 & 5 & 2 & 7 & 4 & 1 & 6 & 3 \\ 0 & 6 & 4 & 2 & 0 & 6 & 4 & 2 \\ 0 & 7 & 6 & 5 & 4 & 3 & 2 & 1 \end{bmatrix}$$

Fig. 11

RADIO TRANSMISSION DEVICE, BASEBAND PROCESSING DEVICE, RADIO TRANSMISSION METHOD, AND RADIO RECEPTION DEVICE

This application is a National Stage Entry of PCT/JP2018/040822 filed on Nov. 2, 2018, which claims priority from Japanese Patent Application 2017-239655 filed on Dec. 14, 2017, the contents of all of which are incorporated herein by reference, in their entirety.

TECHNICAL FIELD

The present disclosure relates to a radio transmission device, a baseband processing device, a radio transmission method, and a radio reception device.

BACKGROUND ART

Conventionally, a mobile radio communication device using an MIMO (multiple-input and multiple-output) transmission system has been proposed (for example, Patent Literature 1). The mobile radio communication device disclosed in Patent Literature 1 performs phase rotation processing in a step before the linear precoding processing to reduce the PAPR (Peak to Average Power Ratio) by phase rotation while maintaining the effect of linear precoding processing.

Meanwhile, in recent years, a radio transmission system that uses electromagnetic waves having OAM (orbital angular momentum) (i.e., OAM transmission system) has been attracting attention (for example, Patent Literature 2). There are plurality of modes (i.e., a plurality of OAM modes) that differ in phase shift amount applied to a plurality of occupied antenna devices in the OAM transmission system.

CITATION LIST

Patent Literature

Patent Literature 1: Japanese Unexamined Patent Application Publication No. 2009-194732
Patent Literature 2: United States Patent Application Publication No. 2017/0163451

SUMMARY OF INVENTION

Technical Problem

The inventors of the present disclosure have found a new problem that when a multiplex signal is radio transmitted using the OAM transmission system, the peak to average power ratio becomes large.

An object of the present disclosure is to provide a radio transmission device, a baseband processing device, a radio transmission method, and a radio reception device that can reduce the peak to average power ratio in multiplex transmission using the OAM transmission system.

Solution to Problem

A radio transmission device according to a first example aspect is a radio transmission device configured to transmit a radio signal by an OAM transmission system using N number (N is a natural number equal to or larger than 2) of antenna devices in fixed radio communication, the radio transmission device including:

a signal formation unit configured to form N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix; and a radio transmission unit configured to up-convert the formed N number of multiplex signals and outputting the up-converted signals to the N number of antenna devices, respectively.

A baseband processing device according to a second example aspect is a baseband processing device used in a radio transmission device configured to transmit a radio signal by an OAM transmission system using N number (N is a natural number equal to or larger than 2) of antenna devices in fixed radio communication, the baseband processing device including:

a signal formation unit configured to form N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix.

A radio transmission method according to a third example aspect is a radio transmission method of transmitting a radio signal by an OAM transmission system using N number (N is a natural number equal to or larger than 2) of antenna devices in fixed radio communication, the radio transmission method including:

forming N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix; and up-converting the formed N number of multiplex signals and outputting the up-converted signals to the respective N number of antenna devices, respectively.

A radio reception device according to a fourth example aspect is a radio reception device configured to receive a radio signal transmitted by an OAM transmission system using L number (L is a natural number equal to or larger than 2) of antenna devices in fixed radio communication, the radio reception device including:

a separation unit configured to execute signal separation processing by multiplying L number of reception signals received by the L number of antenna devices by a signal separation matrix; and a demodulation unit configured to execute demodulation of a signal separated by the separation means, in which an initial matrix of the signal separation matrix used at an initial stage of the signal separation processing is a conjugate transpose matrix of a used weighting matrix that is used when forming a multiplex signal in a device on the radio signal transmission side, and the used weighting matrix is a matrix obtained by adding a phase rotation matrix for suppressing a peak to a fixed basic weighting matrix.

Advantageous Effects of Invention

According to the present disclosure, it is possible to provide a radio transmission device, a baseband processing device, a radio transmission method, and a radio reception device that can reduce the peak to average power ratio in multiplex transmission using the OAM transmission system.

BRIEF DESCRIPTION OF DRAWINGS

FIG. 4 is diagram showing an example of an OAM basic weighting matrix when N=4 and M=4;

FIG. 5 is a diagram showing an example of a corrected weighting matrix according to the second example embodiment;

FIG. 10 is a diagram showing an example of an OAM basic weighting matrix when N=8 and M=8;

FIG. 11 is a diagram for describing a corrected weighting matrix in <Modified example embodiment 1> according to the second example embodiment.

DESCRIPTION OF EMBODIMENTS

Example embodiments are described hereinbelow with reference to the drawings. Note that in the example embodiments, the same or the corresponding elements are assigned the same reference symbol and duplicated explanations thereof are omitted.

First Example Embodiment

<Example of Configuration of Baseband Processing Device>

Figure 1:
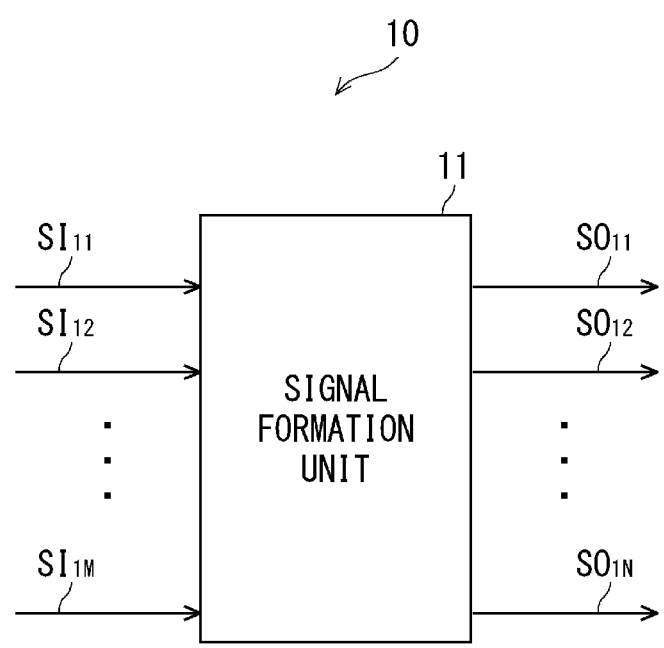
FIG. 1 is a block diagram showing an example of a baseband processing device according to a first example embodiment.

FIG. 1 is a block diagram showing an example of a baseband processing device according to a first example embodiment. In FIG. 1, a baseband processing device 10 includes a signal formation unit 11.

The signal formation unit 11 receives M number (M is a natural number equal to or larger than 2) of data symbols $SI_{11}$ to $SI_{1M}$ that differ from each other and that are in parallel to each other. Then, the signal formation unit 11 multiplies the input data symbols $SI_{11}$ to $SI_{1M}$ by a "corrected weighting matrix" to form N number (N is a natural number equal to or larger than 2) of multiplex signals $SO_{11}$ to $SO_{1N}$ corresponding to N number of antenna devices, respectively. Then, the signal formation unit 11 outputs the N number of multiplex signals $SO_{11}$ to $SO_{1N}$ that are formed. The N number of multiplex signals $SO_{11}$ to $SO_{1N}$ are transmitted from the N number of antenna devices (not shown), respectively.

The aforementioned "corrected weighting matrix" is a matrix obtained by adding a "phase rotation matrix" for suppressing the peak to a fixed "OAM basic weighting matrix". The "corrected weighting matrix", the "OAM basic weighting matrix", and the "phase rotation matrix" are matrices of N-by-M.

N number of row vectors in the aforementioned "OAM basic weighting matrix" correspond to the aforementioned N number of antenna devices, respectively. Further, M number of column vectors in the aforementioned "OAM basic weighting matrix" correspond to M number of "OAM modes" that differ from each other, respectively. That is, the M number of column vectors in the "OAM basic weighting matrix" differ from each other as regards a deviation amount (a phase shift amount) between values of the N number of vector elements within the column vectors. By the "OAM basic weighting matrix", the M number of data symbols $SI_{11}$ to $SI_{1M}$ are transmitted in different "OAM modes".

Further, an amount of a vector element of the column vector included in a "first group" among the M number of column vectors in the aforementioned "phase rotation matrix" is a "first angular value" other than a multiple of π/2 and a vector element of the column vector included in a "second group" which was not included in the first group is zero. The "first angular value" is, for example, π/4.

Here, in a fixed radio communication, QAM (quadrature amplitude modulation) is widely used in order to enlarge data capacity. Since constellation by the QAM has rotational symmetry of π/2, it causes an increase in the power peak at the time of forming the multiplex signal by the "OAM basic weighting matrix". To be more specific, when the multiplex signal is formed from the data symbols $SI_{11}$ to $SI_{1M}$ using only the "OAM basic weighting matrix", the multiplex signal is formed of the product of the row vector of the "OAM basic weighting matrix" and the column vector that has the data symbols $SI_{11}$ to $SI_{1M}$ as elements. At this time, the closer the elements of the row vector of the "OAM basic weighting matrix" to a multiplicative relationship of π/2, the more the maximum vectors in the constellation are synthesized, leading to an increase in the power peak.

On the other hand, herein, the multiplex signal is formed from the data symbols $SI_{11}$ to $SI_{1M}$ using the "corrected weighting matrix" obtained by correcting the "OAM basic weighting matrix" by the "phase rotation matrix". By this configuration, it is possible to rotate the I-axis and the Q-axis of the constellation of a part of the data symbols $SI_{11}$ to $SI_{1M}$ so as not to overlap the I-axis and the Q-axis of the constellation of the rest. Accordingly, it is possible to reduce the number of maximum vectors in the constellation that are synthesized, whereby the peak to average power ratio can be reduced.

Here, it is possible to multiply the data symbols $SI_{11}$ to $SI_{1M}$ by each of the "OAM basic weighting matrix" and the "phase rotation matrix" in the two functional units. On the other hand, herein, the signal formation unit 11, which is one of the functional units, multiplies the data symbols $SI_{11}$ to $SI_{1M}$ by the "corrected weighting matrix" which is obtained by correcting the "OAM basic weighting matrix" by the "phase rotation matrix" in advance. Accordingly, it is possible to simplify the configuration of the baseband processing device 10 as well as to reduce the processing amount of the baseband processing device 10.

<Example of Configuration of Signal Separation Device>

Figure 2:
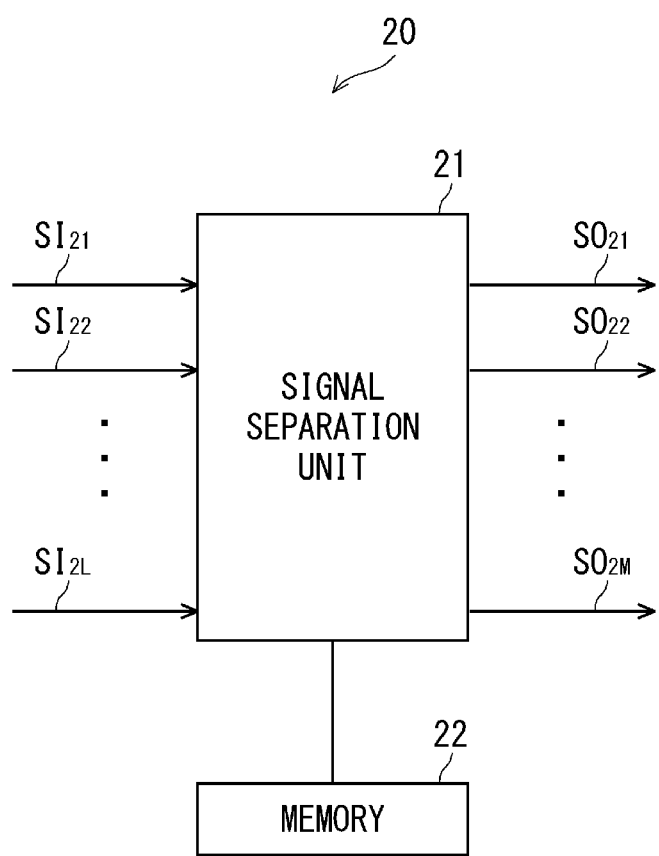
FIG. 2 is a block diagram showing an example of a signal separation device according to the first example embodiment.

FIG. 2 is a block diagram showing an example of a signal separation device according to the first example embodiment. In FIG. 2, a signal separation device 20 includes a signal separation unit 21 and a memory 22.

The signal separation unit 21 performs signal separation processing by multiplying L number (L is a natural number equal to or larger than 2) of reception signals $SI_{21}$ to $SI_{2L}$, which are received by L number of antenna devices (not shown), by a "signal separation matrix". By this signal separation processing, data symbols $SO_{21}$ to $SO_{2M}$ are obtained. These data symbols $SO_{21}$ to $SO_{2M}$ ideally coincide with the data symbols $SI_{11}$ to $SI_{1M}$ on the transmission side. Further, the signal separation unit 21 adaptively corrects the "signal separation matrix" in order to improve the signal separation accuracy.

Here, when L=N, an "initial matrix of the signal separation matrix" used at an initial stage of the signal separation processing is a conjugate transpose matrix of a "used weighting matrix (i.e., the corrected weighting matrix)" which is used when forming the multiplex signal in the baseband processing device 10 on the transmission side. The "initial matrix of the signal separation matrix" is stored (maintained) in the memory 22.

Second Example Embodiment

In a second example embodiment, examples of a radio transmission device on which the baseband processing device described in the first example embodiment is mounted and a radio reception device on which the signal separation device described in the first example embodiment is mounted are explained. The radio transmission device and the radio reception device are fixedly arranged within the line-of-sight and used. That is, fixed radio communication within the line-of-sight is performed between the radio transmission device and the radio reception device.

<Example of Configuration of Radio Transmission Device>

Figure 3:
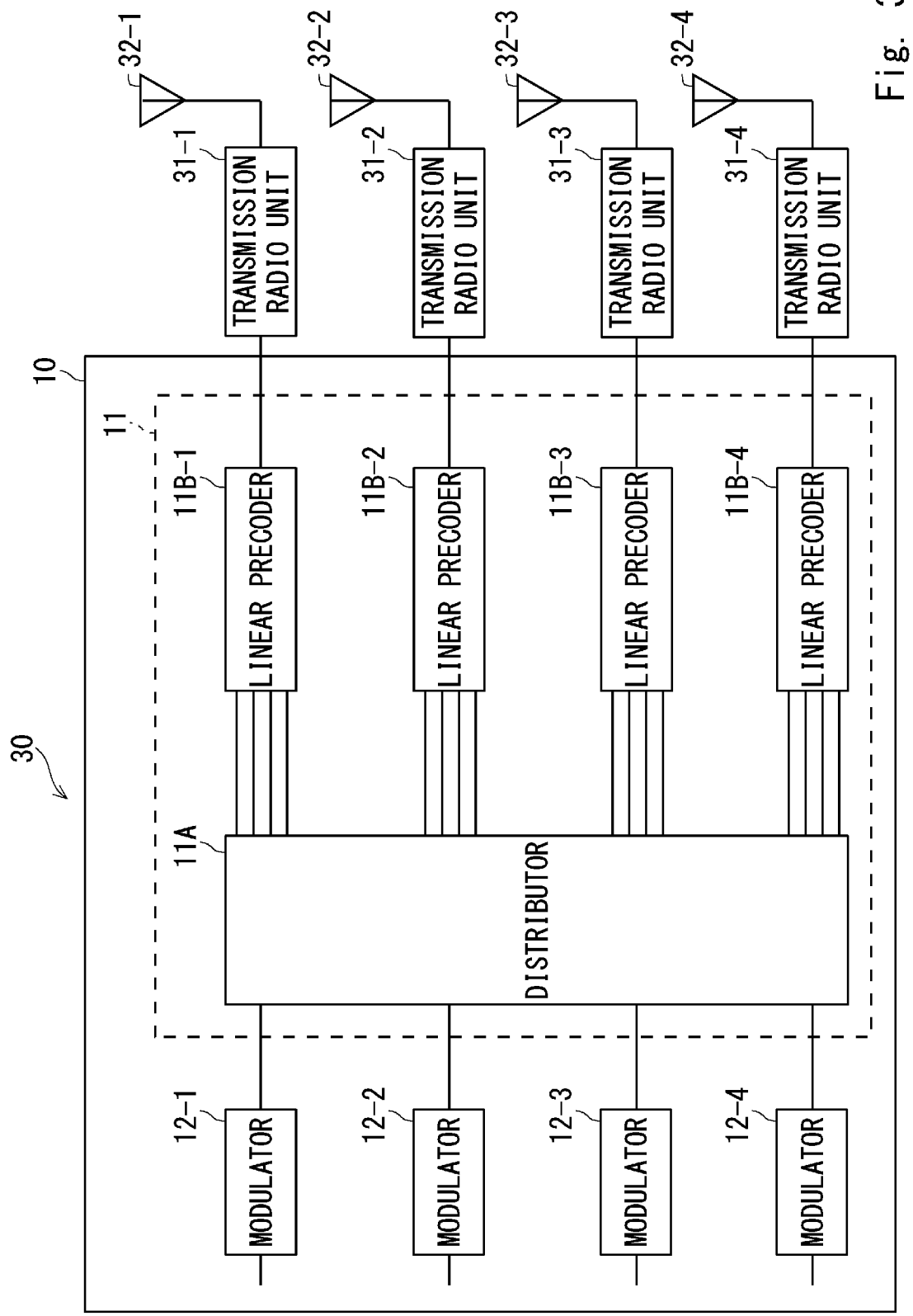
FIG. 3 is a block diagram showing an example of a radio transmission device on which a baseband processing device according to a second example embodiment is mounted.

FIG. 3 is a block diagram showing an example of a radio transmission device on which a baseband processing device according to the second example embodiment is mounted. In FIG. 3, a radio transmission device 30 includes the base band processing device (the baseband processing unit) 10, transmission radio units 31-1 to 31-4, and antenna devices 32-1 to 32-4 that are, for example, circumferentially arranged at regular intervals. Here, an explanation is given, taking a case where the aforementioned N is 4 and the aforementioned M is 4 as an example. Note that the transmission radio units 31-1 to 31-4 can be collectively referred to as transmission radio units 31. Further, the antenna devices 32-1 to 32-4 can be collectively referred to as antenna devices 32.

The base band processing device 10 according to the second example embodiment includes the signal formation unit 11 and modulators 12-1 to 12-4. Further, the signal formation unit 11 includes a distributor 11A and linear precoders 11B-1 to 11B-4. Note that the modulators 12-1 to 12-4 are collectively referred to as modulators 12. Further, the linear precoders 11B-1 to 11B-4 are collectively referred to as liner precoders 11B.

The modulators 12-1 to 12-4 receive transmission data streams that are different from each other. Further, each modulator 12 outputs a modulation signal (that is, the data symbol) obtained by modulating the input transmission data. That is, four different data symbols are simultaneously output from the modulators 12-1 to 12-4.

In the signal formation unit 11, the distributor 11A outputs the four data symbols that are simultaneously input to the four linear precoders 11B-1 to 11B-4. That is, the distributor 11A distributes the data symbol $SI_{11}$ received from the modulator 12-1 to the four linear precoders 11B-1 to 11B-4 so as to input the data symbol into each of the four linear precoders 11B-1 to 11B-4. The same applies for the data symbol $SI_{12}$ output from the modulator 12-2, the data symbol $SI_{13}$ output from the modulator 12-3, and the data symbol $SI_{14}$ output from the modulator 12-4. That is, each linear precoder 11B has the data symbol vectors of the data symbols $SI_{11}$ to $SI_{14}$ input therein.

The linear precoders 11B-1 to 11B-4 correspond to the four row vectors of the "corrected weighting matrix", respectively.

Here, as explained in the first example embodiment, the "corrected weighting matrix" is a matrix obtained by adding the "phase rotation matrix" for suppressing the peak to the fixed "OAM basic weighting matrix". The OAM basic weighting matrix W (N, M) can be expressed by the following Expression (1) in which the matrix is of an N-th row from row 0 to row N–1 and an M-th column from column 0 to column M–1:

[Expression 1]

$$W(N,M)=\{w_{n,m}|n=\{0,\ldots,N-1\},m=\{0,\ldots,M-1\}\} \quad (1)$$

Further, the elements in each row and column of the OAM basic weighting matrix W (N, M) can be expressed by the following Expression (2):

[Expression 2]

$$w_{n,m}=e^{i\frac{2\pi}{N}nm} \quad (2)$$

As described above, herein, it is assumed that the aforementioned N is 4 and the aforementioned M is 4 in which case the "OAM basic weighting matrix" has a configuration shown in FIG. 4. FIG. 4 is diagram showing an example of the OAM basic weighting matrix when N=4 and M=4. In the OAM basic weighting matrix shown in FIG. 4, the four column vectors of the column numbers 0, 1, 2, and 3 correspond to modes 0, 1, 2, and 3, respectively. That is, the deviation amount (the phase shift amount) between the values of the four vector elements within the column vector of the column number 0 is zero. Further, the deviation amount (the phase shift amount) between the values of the four vector elements within the column vector of the column number 1 is $\pi/2$. Further, the deviation amount (the phase shift amount) between the values of the four vector elements within the column vector of the column number 2 is $\pi$. Further, the deviation amount (the phase shift amount) between the values of the four vector elements within the column vector of the column number 3 is $3\pi/2$.

Then, by adding the "phase rotation matrix" for suppressing the peak to the fixed "OAM basic weighting matrix" described above, the "corrected weighting matrix" is obtained.

FIG. 5 is a diagram showing an example of the corrected weighting matrix according to the second example embodiment. In the example shown in FIG. 5, the corrected weighting matrix is obtained by adding $\pi/4$ to each of the vector elements of the column vectors of the column numbers 1 and 3 of the OAM basic weighting matrix shown in FIG. 4. That is, among the four column vectors of the "phase rotation matrix", the column vectors of the column numbers 1 and 3 correspond to the aforementioned "first group" and the column vectors of the column numbers 0 and 2 correspond to the aforementioned "second group".

Referring again to the explanation of FIG. 3, the linear precoder 11B multiplies the input data symbol vector by the row vector corresponding to each of the linear precoders 11B. Accordingly, the multiplex signal is formed.

Figure 6:
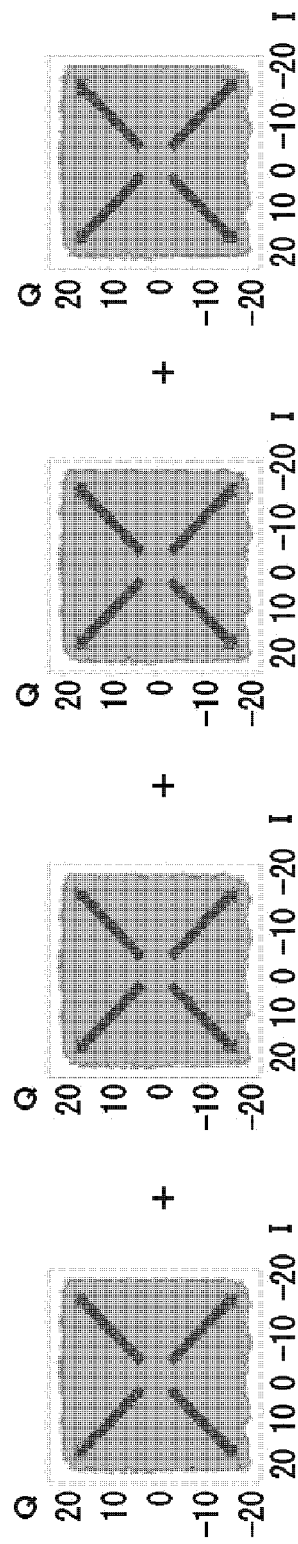
FIG. 6 is a diagram for describing occurrence of a power peak.

Here, as shown in FIG. 6, the I-axis and the Q-axis of the constellation of the data symbols $SI_{11}$ to $SI_{14}$ coincide with each other. Therefore, when the multiplex signal is formed from the data symbols $SI_{11}$ to $SI_{14}$ using only the "OAM basic weighting matrix" like the one shown in FIG. 4, there is a possibility that the power peak could occur. The arrows in FIG. 6 show the maximum vector in the constellation. FIG. 6 is a diagram for describing the occurrence of the power peak.

Figure 7:
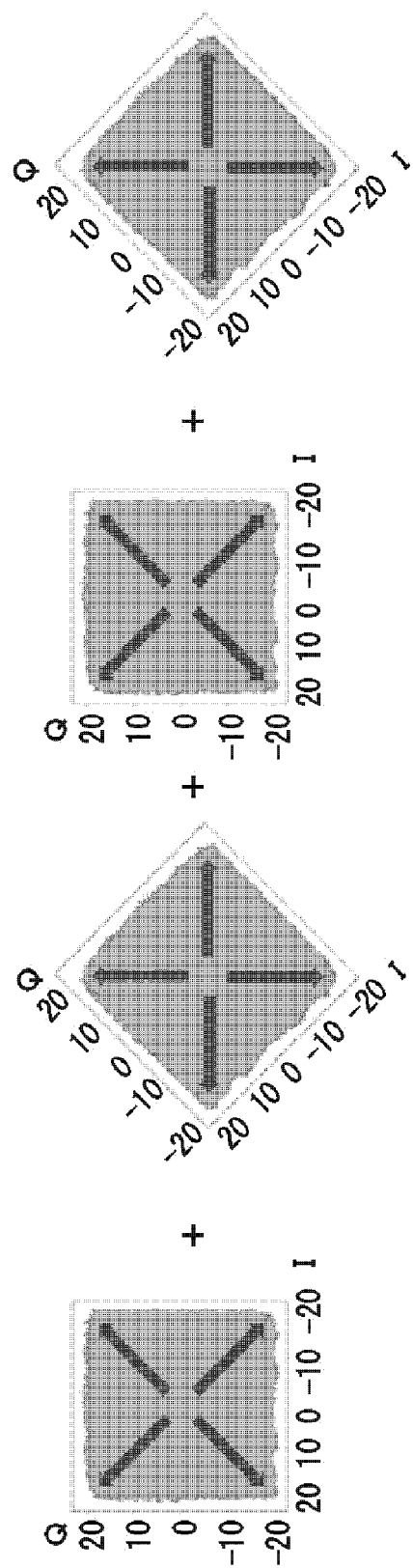
FIG. 7 is a diagram for describing the reduction in a peak to average power ratio.

On the other hand, when the multiplex signal is formed from the data symbols $SI_{11}$ to $SI_{14}$ using the "corrected weighting matrix" shown in FIG. 5, the constellations of the data symbols $SI_{12}$ and $SI_{14}$ are rotated by $\pi/4$ as shown in FIG. 7, whereby the peak to average power ratio can be reduced. FIG. 7 is a diagram for describing the reduction in the peak to average power ratio.

Referring again to the explanation of FIG. 3, the transmission radio units 31-1 to 31-4 receive a multiplex signal from the linear precoders 11B-1 to 11B-4, respectively, and perform radio transmission processing (digital-analogue conversion, up-conversion etc.) to the received multiplex signal. Then, the transmission radio units 31-1 to 31-4 output the radio signal obtained through the radio transmission processing to the antenna devices 32-1 to 32-4, respectively. Accordingly, the radio signal is transmitted from the antenna devices 32-1 to 32-4 by the OAM transmission system.

<Example of Configuration of Radio Reception Device>

Figure 8:
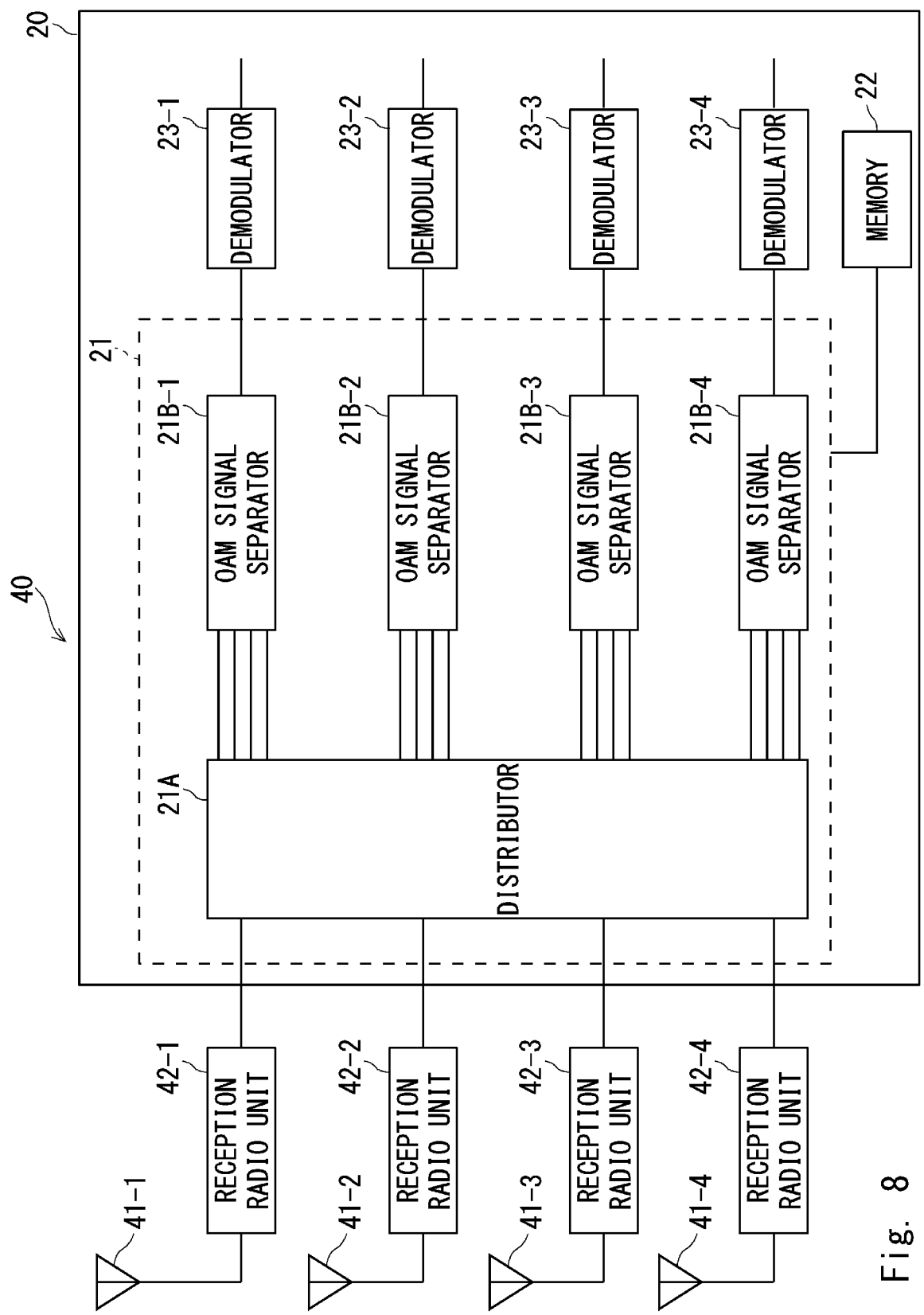
FIG. 8 is block diagram showing an example of a radio reception device mounted on the signal separation device according to the second example embodiment.

FIG. 8 is block diagram showing an example of a radio reception device mounted on the signal separation device according to the second example embodiment. In FIG. 8, a radio reception device 40 includes the signal separation device 20, antenna devices 41-1 to 41-4 that are, for example, circumferentially arranged at regular intervals, and reception radio units 42-1 to 42-4. Here, an explanation is given taking a case where the aforementioned L is 4 as an example. Note that the antenna devices 41-1 to 41-4 can be collectively referred to as antenna devices 41. Further, the reception radio units 42-1 to 42-4 are collectively referred to as reception radio units 42.

Figure 9:
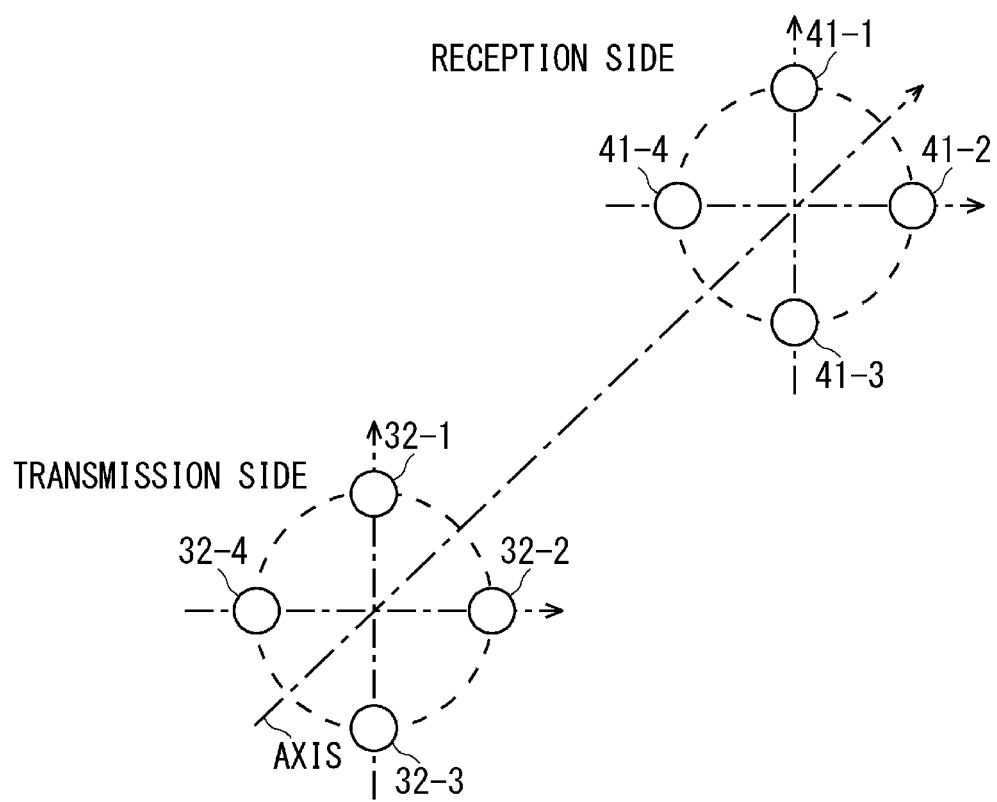
FIG. 9 is a diagram for describing an ideal condition in OAM multiplex transmission using UCA (Uniform Circular Array) antennas.

Here, as described above, communication using the OAM transmission system is performed between the radio transmission device 30 and the radio reception device 40 using the antenna devices 32-1 to 32-4 that are circumferentially arranged at regular intervals and the antenna devices 41-1 to 41-4 that are circumferentially arranged at regular intervals. In the OAM multiplex transmission using UCA (Uniform Circular Array) antennas as described above, communication is initiated assuming the state that is close to that of an ideal condition in which the axes of array antennas coincide on the transmission side and the reception side (see, FIG. 9). FIG. 9 is a diagram for describing an ideal condition in OAM multiplex transmission using the UCA (Uniform Circular Array) antennas. The "axis" shown in FIG. 9 represents an imaginary line that passes through the center of the array antennas and is perpendicular to the antenna plane.

Turning back to the explanation of FIG. 8, the signal separation device 20 according to the second example embodiment includes the signal separation unit 21, the memory 22, and demodulators 23-1 to 23-4. Further, the signal separation unit 21 includes a distributor 21A and OAM signal separators 21B-1 to 21B-4. Note that the OAM signal separators 21B-1 to 21B-4 are collectively referred to as OAM signal separators 21B.

Each of the antenna devices 41-1 to 41-4 receives a spatial multiplex signal which is obtained by spatially multiplexing the radio signal transmitted from each of the antenna devices 32-1 to 32-4 of the radio transmission device 30.

The reception radio units 42-1 to 42-4 correspond to the antenna devices 41-1 to 41-4, respectively. Each of the reception radio units 42 performs radio reception processing (down conversion, analogue-digital conversion etc.) on a received radio signal which is received from the corresponding antenna device 41. Then, each of the reception radio units 42-1 to 42-4 outputs the reception signal that has been subjected to radio reception processing to the signal separation unit 21.

In the signal separation unit 21, the distributor 21A outputs the four reception signals that are simultaneously input to the four OAM signal separators 21B-1 to 21B-4, respectively. That is, the distributor 21A distributes the reception signal $SI_{21}$ received from the reception radio unit 42-1 to the four OAM signal separators 21B-1 to 21B-4 and inputs the signal into each of the OAM signal separators 21B-1 to 21B-4. The same applies for the reception signal $SI_{22}$ output from the reception radio unit 42-2, the reception signal $SI_{23}$ output from the reception radio unit 42-3, and the reception signal $SI_{24}$ output from the reception radio unit 42-4. That is, reception signal vectors of the reception signals $SI_{21}$ to $SI_{24}$ are input to each of the OAM signal separators 21B.

The OAM signal separators 21B-1 to 21B-4 correspond to the four row vectors of the "signal separation matrix", respectively. As described above, an "initial matrix of the signal separation matrix" used at an initial stage of the signal separation processing is a conjugate transpose matrix of a "used weighting matrix (i.e., the corrected weighting matrix described above)" which is used when forming the multiplex signal in the baseband processing device 10 on the transmission side. The "initial matrix of the signal separation matrix" is stored (maintained) in the memory 22.

Each of the OAM signal separators 21B multiplies the input reception signal vector by the row vector corresponding to each of the OAM signal separators 21B. Accordingly, the data symbols $SO_{21}$ to $SO_{24}$ are obtained. Ideally, these data symbols $SO_{21}$ to $SO_{24}$ coincide with the data symbols $SI_{11}$ to $SI_{14}$ on the transmission side.

The demodulators 23-1 to 23-4 obtain reception data by performing demodulation processing using the data symbols $SO_{21}$ to $SO_{24}$ output from the OAM signal separators 21B-1 to 21B-4.

As described above, according to the second example embodiment, the radio transmission device 30 transmits the radio signal by the OAM transmission system using N number (N is a natural number equal to or larger than 2) of antenna devices 32 in the fixed radio communication. The N number of antenna devices 32 are circumferentially arranged at regular intervals. In the radio transmission device 30, the signal formation unit 11 multiplies the M number (M is a natural number equal to or larger than 2) of data symbols that differ from each other and that are in parallel to each other by a "corrected weighting matrix" to form N number of multiplex signals corresponding to the N number of antenna devices 32, respectively. The "corrected weighting matrix" is obtained by adding the phase rotation matrix for suppressing the peak to the fixed OAM basic weighting matrix.

By this configuration of the radio transmission device 30, it is possible to rotate the I-axis and the Q-axis of the constellation of a part of the M number of data symbols so as not to overlap the I-axis and the Q-axis of the constellation of the rest. Accordingly, it is possible to reduce the number of maximum vectors in the constellation that are synthesized whereby the peak to average power ratio can be reduced. Further, the signal formation unit 11, which is one functional unit, multiplies the M number of data symbols by the "corrected weighting matrix" which is obtained by correcting the "OAM basic weighting matrix" by the "phase rotation matrix" in advance. Accordingly, it is possible to simplify the configuration of the baseband processing device 10 in the radio transmission device 30 as well as to reduce the processing amount of the baseband processing device 10.

Here, the radio transmission device 30 and the radio reception device 40 are fixedly arranged within the LOS (the line-of-sight) and the fixed radio communication within the LOS by the OAM transmission system is performed. By this configuration, the status of a plurality of transmission paths (channels) between the antenna devices 32-1 to 32-N of the radio transmission device 30 and the antenna devices 41-1 to 41-L of the radio reception device 40 can be regarded as being the same and constant. Therefore, the channel matrix can be regarded as being constant. By this configuration, the "phase rotation matrix" of the radio transmission device 30 can be fixed and thus, it is possible to prepare, in advance, the "corrected weighting matrix" which is obtained by correcting the "OAM basic weighting matrix" by the "phase rotation matrix".

Further, the radio reception device 40 receives the radio signal transmitted by the OAM transmission system in the fixed radio communication using the L number (L is a natural number equal to or larger than 2) of antenna devices 41. The L number of antenna devices 41 are circumferentially arranged at regular intervals. In the radio reception device 40, the signal separation unit 21 preforms signal separation processing by multiplying the L number of reception signals received by the L number of antenna devices 41 by the "signal separation matrix". The initial matrix of the signal separation matrix used at the initial stage of the signal separation processing is a conjugate transpose matrix of the used weight matrix which is used when forming the multiplex signal in the device on the radio signal transmission side. The used weighting matrix is a matrix obtained by adding the phase rotation matrix for suppressing the peak to the fixed OAM basic weighting matrix.

By the configuration of the radio reception device 40, it is possible to perform the signal separation more efficiently.

Modified Example Embodiment 1

In the aforementioned explanation, the case where N=4, M=4, and L=4 has been explained, but it is not be limited thereto. For example, it can be assumed that N=8, M=8, and L=8. FIG. 10 is a diagram showing an example of the OAM basic weighting matrix when N=8 and M=8. In the example of the OAM basic weighting matrix shown in FIG. 10, the amount of deviation (the phase shift amount) of the eight vector elements within the column vector of the column number 0 is zero. Further, the amount of deviation (the phase shift amount) among the eight vector elements within the column vector of the column number 1 is $\pi/4$. Further, the amount of deviation (the phase shift amount) among the eight vector elements within the column vector of the column number 2 is $\pi/2$.

Further, by adding the "phase rotation matrix" for suppressing the peak to the fixed "OAM basic weighting matrix" described above, the "corrected weighting matrix" can be obtained.

FIG. 11 is a diagram for describing the corrected weighting matrix in <Modified example embodiment 1> according to the second example embodiment. In the example shown in FIG. 11, the corrected weighting matrix is obtained by adding $\pi/4$ to each vector element of the column vector of the column numbers 0 and 2 of the OAM basic weighting matrix shown in FIG. 10. That is, among the eight column vectors of the "phase rotation matrix", the column vectors of the column numbers 0 and 2 correspond to the "first group" and the column vectors of the column numbers 1, 3, 4, 5, 6, and 7 correspond to the "second group". In other words, the "first group" is configured of a part of the plurality of column vectors in the phase rotation matrix corresponding to the plurality of column vectors having the values of the eight vector elements deviated by a multiple of $\pi/2$ in a fixed direction in the OAM basic weighting matrix. That is, the plurality of column vectors of the phase rotation matrix corresponding to the plurality of column vectors having the values of the eight vector elements deviated by the multiple of $\pi/2$ in a fixed direction in the OAM basic weighting matrix is the column vectors of the column numbers 0, 2, 4, and 6. Here, the first group is configured of the column vectors of the column numbers 0 and 2 which are a part of the column vectors of the column numbers 0, 2, 4, and 6.

Modified Example Embodiment 2

In the aforementioned explanation, the case where the conjugate transpose matrix of the "corrected weighting matrix" used at the transmission side is the "initial matrix of the signal separation matrix" in the signal separation unit 21 has been explained, but it is not limited thereto. For example, the conjugate transpose matrix of the "OAM basic weighting matrix" may be used as the "initial matrix of the signal separation matrix" in the signal separation unit 21.

Modified Example Embodiment 3

The signal formation unit 11 may switch its processing between the "peak suppression execution mode" and "peak suppression non-execution mode". That is, in the "peak suppression execution mode", the signal formation unit 11 multiplies the input data symbols $SI_{11}$ to $SI_{1M}$ by the "corrected weighting matrix" whereby N number (N is a natural number equal to or larger than 2) of multiplex signals $SO_{11}$ to $SO_{1N}$ corresponding to N number of antenna devices, respectively are formed. On the other hand, in the "peak suppression non-execution mode", the signal formation unit 11 multiplies the input data symbols $SI_{11}$ to $SI_{1M}$ by the "OAM basic weighting matrix" whereby N number (N is a natural number equal to or larger than 2) of multiplex signals $SO_{11}$ to $SO_{1N}$ corresponding to N number of antenna devices, respectively are formed.

Other Example Embodiments

Figure 12:
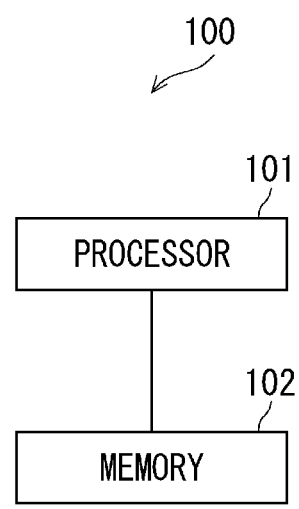
FIG. 12 is a diagram showing an example of a hardware configuration of a baseband processing device.

FIG. 12 is a diagram showing an example of a hardware configuration of a baseband processing device. In FIG. 12, a baseband processing device 100 includes a processor 101 and a memory 102. The signal formation unit 11 of the baseband processing device 10 explained in the first and the second example embodiments is realized by causing the processor 101 to read the program stored in the memory 102.

Note that the present disclosure in not limited to the example embodiments described above and can be modified as appropriate without departing from the gist of the present disclosure.

As described above, the present disclosure has been explained with reference the example embodiments, however, it is not limited thereto. Various modifications that can be understood by a person skilled in the art within the scope of the present disclosure can be made to the configuration and the details of the present disclosure.

The whole or part of the example embodiments disclosed above can be described as, but not limited to, the following supplementary notes.

(Supplementary Note 1)

A radio transmission device configured to transmit a radio signal by an OAM transmission system using N number (N is a natural number equal to or larger than 2) of antenna devices in fixed radio communication, the radio transmission device comprising:

a signal formation unit configured to form N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix; and a radio transmission unit configured to up-convert the formed N number of multiplex signals and output the up-converted signals to the respective N number of antenna devices, respectively.

(Supplementary Note 2)

The radio transmission device described in Supplementary note 1, wherein:

N number of row vectors of the basic weighting matrix correspond to the N number of antenna devices, respectively;

M number of column vectors of the basic weighting matrix correspond to M number of OAM modes that differ from each other, respectively;

a value of each vector element of the column vector included in a first group among M number of column vectors of the phase rotation matrix is a first angular value other than a multiple of $\pi/2$; and a value of each vector element of the column vector included in a second group which was not included in the first group of the phase rotation matrix is zero.

(Supplementary Note 3)

The radio transmission device described in Supplementary note 2, wherein the first angular value is $\pi/4$.

(Supplementary Note 4)

The radio transmission device described in Supplementary note 2 or 3, wherein when the value M is four, the two column vectors of the phase rotation matrix are included in the first group and the rest of the column vectors other than the two column vectors are included in the second group.

(Supplementary Note 5)

The radio transmission device described in Supplementary note 2 or 3, wherein when the value M is 8, the first group is configured of column vectors of the phase rotation matrix corresponding to column vectors in which values of the N number of vector elements are deviated by a multiple of $\pi/2$ in a fixed direction in the OAM basic weighting matrix.

(Supplementary Note 6)

The radio transmission device described in any one of Supplementary notes 1 to 5, wherein the signal formation unit multiplies the M number of data symbols by the corrected weighting matrix when in a peak suppression execution mode and by the basic weighting matrix when in a peak suppression non-execution mode.

(Supplementary Note 7)

A baseband processing device used in a radio transmission device configured to transmit a radio signal by an OAM transmission system using N number (N is a natural number equal to or larger than 2) of antenna devices in fixed radio communication, the baseband processing device comprising:

a signal formation unit configured to form N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix.

(Supplementary Note 8)

The baseband processing device described in Supplementary note 7, wherein:

N number of row vectors of the basic weighting matrix correspond to the N number of antenna devices, respectively;

M number of column vectors of the basic weighting matrix correspond to M number of OAM modes that differ from each other, respectively;

a value of each vector element of the column vector included in a first group among M number of column vectors of the phase rotation matrix is a first angular value other than a multiple of $\pi/2$; and a value of each vector element of the column vector included in a second group which was not included in the first group of the phase rotation matrix is zero.

(Supplementary Note 9)

The baseband processing device described in Supplementary note 8, wherein the first angular value is $\pi/4$.

(Supplementary Note 10)

The baseband processing device described in Supplementary note 8 or 9, wherein when the value M is four, the two column vectors of the phase rotation matrix are included in the first group and the rest of the column vectors other than the two column vectors are included in the second group.

(Supplementary Note 11)

The baseband processing device described in Supplementary note 8 or 9, wherein when the value M is 8, the first group is configured of column vectors of the phase rotation matrix corresponding to column vectors in which values of the N number of vector elements are deviated by a multiple of $\pi/2$ in a fixed direction in the OAM basic weighting matrix.

(Supplementary Note 12)

The baseband processing device described in any one of Supplementary notes 7 to 11, wherein the signal formation unit multiplies the M number of data symbols by the corrected weighting matrix when in a peak suppression execution mode and by the basic weighting matrix when in a peak suppression non-execution mode.

(Supplementary Note 13)

A radio transmission method of transmitting a radio signal by an OAM transmission system using N number (N is a natural number equal to or larger than 2) of antenna devices in fixed radio communication, the radio transmission method comprising:

forming N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix; and up-converting the formed N number of multiplex signals and outputting the up-converted signals to the respective N number of antenna devices, respectively.

(Supplementary Note 14)

The radio transmission method described in Supplementary note 13, wherein:

N number of row vectors of the basic weighting matrix correspond to the N number of antenna devices, respectively;

M number of column vectors of the basic weighting matrix correspond to M number of OAM modes that differ from each other, respectively a value of each vector element of the column vector included in a first group among M number of column vectors of the phase rotation matrix is a first angular value other than a multiple of $\pi/2$; and a value of each vector element of the column vector included in a second group which was not included in the first group of the phase rotation matrix is zero.

(Supplementary Note 15)

A radio reception device configured to receive a radio signal transmitted by an OAM transmission system using L number (L is a natural number equal to or larger than 2) of antenna devices in fixed radio communication, the radio reception device comprising:

a separation unit configured to execute signal separation processing by multiplying L number of reception signals received by the L number of antenna devices by a signal separation matrix; and a demodulation unit configured to execute demodulation of a signal separated by the separation unit, wherein an initial matrix of the signal separation matrix used at an initial stage of the signal separation processing is a conjugate transpose matrix of a used weighting matrix that is used when forming a multiplex signal in a device on the radio signal transmission side, and the used weighting matrix is a matrix obtained by adding a phase rotation matrix for suppressing a peak to a fixed basic weighting matrix.

This application is based upon and claims the benefit of priority from Japanese patent application No. 2017-239655, filed on Dec. 14, 2017, the disclosure of which is incorporated herein in its entirety by reference.

REFERENCE SIGNS LIST

10 BASE BAND PROCESSING DEVICE
11 SIGNAL FORMATION UNIT
11A DISTRIBUTOR
11B LINEAR PRECODER
12 MODULATOR
20 SIGNAL SEPARATION DEVICE
21 SIGNAL SEPARATION UNIT
21A DISTRIBUTOR
21B OAM SIGNAL SEPARATOR
22 MEMORY
23 DEMODULATOR
30 RADIO TRANSMISSION DEVICE
31 TRANSMISSION RADIO UNIT
32 ANTENNA DEVICE
40 RADIO RECEPTION DEVICE
41 ANTENNA DEVICE
42 RECEPTION RADIO UNIT

What is claimed is:

1. A radio transmission device configured to transmit a radio signal by an OAM transmission system using N number (N is a natural number equal to or larger than 2) of antenna devices in fixed radio communication, the radio transmission device comprising:

hardware, including a processor and a memory;

signal formation unit that is implemented at least by the hardware and configured to form N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix; and radio transmitter configured to up-convert the formed N number of multiplex signals and output the up-converted signals to the N number of antenna devices, respectively.

2. The radio transmission device according to claim 1, wherein:

N number of row vectors of the basic weighting matrix correspond to the N number of antenna devices, respectively;

M number of column vectors of the basic weighting matrix correspond to M number of OAM modes that differ from each other, respectively;

a value of each vector element of the column vector included in a first group among M number of column vectors of the phase rotation matrix is a first angular value other than a multiple of $\pi/2$; and a value of each vector element of the column vector included in a second group which was not included in the first group of the phase rotation matrix is zero.

3. The radio transmission device according to claim 2, wherein the first angular value is $\pi/4$.

4. The radio transmission device according to claim 2, wherein when the value M is four, the two column vectors of the phase rotation matrix are included in the first group and the rest of the column vectors other than the two column vectors are included in the second group.

5. The radio transmission device according to claim 2, wherein when the value M is 8, the first group is configured of column vectors of the phase rotation matrix corresponding to column vectors in which values of the N number of vector elements are deviated by a multiple of $\pi/2$ in a fixed direction in the OAM basic weighting matrix.

6. The radio transmission device according to claim 1, wherein the signal formation unit multiplies the M number of data symbols by the corrected weighting matrix when in a peak suppression execution mode and by the basic weighting matrix when in a peak suppression non-execution mode.

7. A baseband processing device used in a radio transmission device configured to transmit a radio signal by an OAM transmission system using N number (N is a natural number equal to or larger than 2) of antenna devices in fixed radio communication, the baseband processing device comprising:

hardware, including a processor and a memory;

signal formation unit that is implemented at least by the hardware and configured to form N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix.

8. The baseband processing device according to claim 7, wherein:
- N number of row vectors of the basic weighting matrix correspond to the N number of antenna devices, respectively;
- M number of column vectors of the basic weighting matrix correspond to M number of OAM modes that differ from each other, respectively;
- a value of each vector element of the column vector included in a first group among M number of column vectors of the phase rotation matrix is a first angular value other than a multiple of $\pi/2$; and
- a value of each vector element of the column vector included in a second group which was not included in the first group of the phase rotation matrix is zero.

9. The baseband processing device according to claim 8, wherein the first angular value is $\pi/4$.

10. The baseband processing device according to claim 8, wherein when the value M is four, the two column vectors of the phase rotation matrix are included in the first group and the rest of the column vectors other than the two column vectors are included in the second group.

11. The baseband processing device according to claim 8, wherein when the value M is 8, the first group is configured of column vectors of the phase rotation matrix corresponding to column vectors in which values of the N number of vector elements are deviated by a multiple of $\pi/2$ in a fixed direction in the OAM basic weighting matrix.

12. The baseband processing device according to claim 7, wherein the signal formation unit multiplies the M number of data symbols by the corrected weighting matrix when in a peak suppression execution mode and by the basic weighting matrix when in a peak suppression non-execution mode.

13. A radio transmission method of transmitting a radio signal by an OAM transmission system using N number (N is a natural number equal to or larger than 2) of antenna devices in fixed radio communication, the radio transmission method comprising:
- forming N number of multiplex signals corresponding to the respective N number of antenna devices by multiplying M number (M is a natural number equal to or larger than 2) of data symbols that are different from and parallel to each other by a corrected weighting matrix obtained by adding a phase rotation matrix for suppressing a peak to a fixed basic weighting matrix; and
- up-converting the formed N number of multiplex signals and outputting the up-converted signals to the N number of antenna devices, respectively.

14. The radio transmission method according to claim 13, wherein:
- N number of row vectors of the basic weighting matrix correspond to the N number of antenna devices, respectively;
- M number of column vectors of the basic weighting matrix correspond to M number of OAM modes that differ from each other, respectively;
- a value of each vector element of the column vector included in a first group among M number of column vectors of the phase rotation matrix is a first angular value other than a multiple of $\pi/2$; and
- a value of each vector element of the column vector included in a second group which was not included in the first group of the phase rotation matrix is zero.

* * * * *